United States Patent
Helgee et al.

(10) Patent No.: US 7,518,082 B2
(45) Date of Patent: Apr. 14, 2009

(54) METHOD FOR ARC WELDING OF DUCTILE CAST IRON

(75) Inventors: Stefan Helgee, Stockholm (SE); Jorma Tani, Nacka (SE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/539,773

(22) PCT Filed: Nov. 29, 2003

(86) PCT No.: PCT/EP03/13478

§ 371 (c)(1),
(2), (4) Date: Dec. 29, 2005

(87) PCT Pub. No.: WO2004/058441

PCT Pub. Date: Jul. 15, 2004

(65) Prior Publication Data

US 2006/0151440 A1    Jul. 13, 2006

(30) Foreign Application Priority Data

Dec. 20, 2002   (DE) ............................... 102 60 358

(51) Int. Cl.
*B23K 9/173*   (2006.01)
*B23K 9/23*    (2006.01)

(52) U.S. Cl. ................................ 219/74; 219/137 WM

(58) Field of Classification Search ............... 219/74, 219/137 WM; 252/372
See application file for complete search history.

(56) References Cited

U.S. PATENT DOCUMENTS

| 3,778,588 | A | * | 12/1973 | Bishel | .............. | 219/146.52 |
| 4,463,243 | A | * | 7/1984 | Church | .................. | 219/74 |
| 4,645,903 | A | * | 2/1987 | De Vito et al. | ........... | 219/137 R |
| 5,124,527 | A | * | 6/1992 | Takano et al. | ............. | 219/137.2 |
| 5,558,791 | A | * | 9/1996 | Fawer | ................ | 219/137 WM |
| 6,303,891 | B1 | * | 10/2001 | Gault | .......................... | 219/74 |

FOREIGN PATENT DOCUMENTS

| DE | 24 37 247 |   | 9/1975 |
| DE | 36 00 813 | * | 7/1987 |
| DE | 36 00 813 A1 | * | 7/1987 |

* cited by examiner

*Primary Examiner*—Kevin P Kerns
(74) *Attorney, Agent, or Firm*—Crowell & Moring LLP

(57) ABSTRACT

A method for joining components made from ductile cast iron and made from ductile cast iron and steel, by arc welding with fusible electrodes under a gas blanket. The gas blanket comprises, in addition to argon, 1 to 25 vol. % carbon dioxide and/or 0.5 to 10 vol. % oxygen. The gas blanket can also comprise nitrogen monoxide. Said method permits high welding speeds and hence a high productivity. The joint quality can be further advantageously improved by means of a pre-heating of the components and a slow cooling or a post-treatment.

24 Claims, 1 Drawing Sheet

Hardness profile over welding joint

Figure 1:
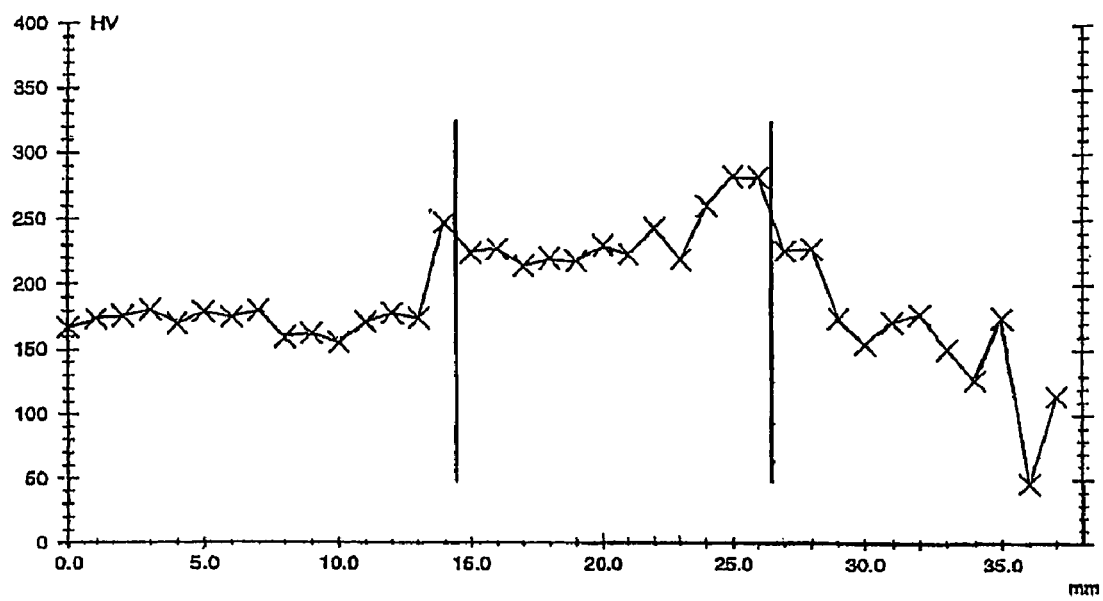

Hardness profile over welding joint

METHOD FOR ARC WELDING OF DUCTILE CAST IRON This application claims the priority of German patent document 102 60 358.8, filed Dec. 20, 2002 (PCT International Application No. PCT/EP2003/013478, filed Nov. 29, 2003), the disclosure of which is expressly incorporated by reference herein.

BACKGROUND AND SUMMARY OF THE INVENTION

This invention relates to a method for arc welding with a consumable electrode under a protective gas for joining parts, where one part is made of ductile cast iron and the other part is made of ductile cast iron or steel and the protective gas contains carbon dioxide and/or oxygen in addition to argon.

Furthermore, the invention relates to a protective gas mixture for arc welding of ductile cast iron with a consumable electrode which contains carbon dioxide and/or oxygen in addition to argon and also relates to the use of a protective gas mixture which contains carbon dioxide and/or oxygen in addition to argon for joining a part made of ductile cast iron to a part made of ductile cast iron or steel by arc welding with a consumable electrode.

Cast iron is smelted as gray pig iron in a blast furnace and produced by remelting. Special features of cast iron include its high carbon and silicon contents. Cast iron typically contains 3 wt % to 4 wt % (percent by weight) carbon and 1 wt % to 3 wt % silicon plus 0.2 wt % to 1 wt % manganese. Cast iron differs fundamentally from steel in its properties and is hard and brittle in comparison with steel. Cast iron is available in various forms, which differ in the properties of the material. The various forms of cast iron are determined by the amounts by weight of the constituents and by the cooling rates after production in a blast furnace. With slow cooling, the dissolved carbon separates out as graphite. This separation of graphite is influenced by nucleating substances and other alloy elements. By adding magnesium or cerium, which is usually in the range of 0.02 wt % to 0.7 wt %, carbon is separated in a spherical form and ductile cast iron is obtained. Ductile cast iron has the highest tensile strength of all types of cast iron and has the greatest breaking strength. The matrix surrounding the carbon has a microstructure, but the type of microstructure depends on the chemical composition of the cast iron, the cooling rates in production and/or a heat treatment of the cast iron. With regard to the matrix, a distinction is made between the ferritic, ferritic-perlitic, perlitic and martensitic microstructures.

Welding of ductile cast iron is possible in principle, but in practice there have been some major problems. Welding of ductile cast iron requires special, highly complex welding techniques in order for the material to be weldable and for satisfactory results to be obtained. In particular, prolonged preheating and cooling procedures or heat treatments following the welding process are to be performed, but the heating and cooling rates must be kept very low to prevent cracks and stresses in the material. Cracks and stresses are formed due to the heat input into the material during welding, thus resulting in changes in structure and reshaping of the microstructure of the matrix. The great temperature differences which promote carbon diffusion processes and thus cause structural changes are responsible for this. Due to preheating and cooling procedures as well as the heat treatment, the ductile cast iron can retain the desired structures, while cracks and stresses may be suppressed. Because of these complex procedures, welding of ductile cast iron is possible only at a very low level of productivity and consequently is not used in production. Welding is used only for repairs and servicing of parts made of cast iron.

In the welding process itself, only very low welding rates are possible in the range of only a very few kg/h. This is another factor leading to a low productivity. The arc used here is a short arc. Using a short arc does not allow higher melting rates because the short arc leads to defective welds at higher butt welding rates. In the past, argon has generally been used as the protective gas for the electric arc. Various welding wires are suitable as the filling material. In most cases the welding wires used are characterized by a high nickel content, often more than 60 wt %. A welding additive material for protective gas welding of cast iron based on nickel, iron, manganese and carbon is also disclosed in DE 24 37 247, for example. This document also recommends an argon-carbon dioxide mixture or an argon-carbon dioxide-oxygen mixture as the protective gas and it recommends a pulsed arc as the electric arc.

These problems are manifested when joining ductile cast iron and also when joining ductile cast iron and steels. These problems are also particularly pronounced when the welding method that is to be used for the weldable steel differs significantly from the welding method for ductile cast iron. Since the welding method for ductile cast iron is a very special method, this is very often the case. A method for joining parts made of cast iron and those made of steel by arc welding using a consumable electrode without preheating the parts is described in DE 36 00 813. According to this publication, the welding is performed by arc welding using a consumable nickel-free electrode under a protective gas in pulsed operation with a two-component or three-component gas mixture consisting of argon, carbon dioxide and/or oxygen. An annealing operation is to be performed downstream from the welding process to suppress unwanted changes in the cast iron with regard to the chemical presence of carbon and the structure.

The object of this invention is to provide a method for arc welding using a consumable electrode which permits welding of ductile cast iron to ductile cast iron and ductile cast iron to steel with a high productivity and thus expands the scope of use of ductile cast iron as a material and in particular the use of ductile cast iron as a material for construction parts and manufacturing parts due to the possibility of welded joints with these parts.

This object is achieved according to this invention by providing carbon dioxide in a range of 1 to 25 vol % and/or oxygen up to a range of 0.5 to 10 vol % in the protective gas and by having the remainder of the protective gas by volume consist of argon or an argon-helium mixture. Surprisingly a change in structure and a negative effect on the properties of the ductile cast iron are largely suppressed with the inventive protective gas and the result is almost stress-free welds. The development of stresses and cracks in and on the weld is also prevented. This is attributed to the fact that with the method according to this invention, the heat supply by the welding wire into the welding bath is controlled and the heat supply into the ductile cast iron material is controlled. With this controlled heat supply, it is possible to suppress the unwanted diffusion of carbon in the ductile cast iron. This prevents the development of hard and brittle areas in the ductile cast iron which are very susceptible to fracture. Instead of that, the existence of microstructures and thus the strength of the ductile cast iron are preserved. The advantages are manifested with all microstructures that may be present in the ductile cast iron. In the case of ductile cast iron, it is possible with the inventive method to achieve acceptable welding results even when a delayed cooling or downstream heat treatment is omitted. Better results are obtained when the cooling is performed more slowly. If the welding operation is followed by a heat treatment, the best welding results are obtained. In addition, due to the use of carbon dioxide and/or oxygen in the protective gas, the properties of the welding bath and the weld are influenced in a positive sense. Carbon dioxide and oxygen increase the heat input at the welding location and stabilize the arc. These two factors suppress the development of pores. High quality welds are formed. The inventive method is suitable for joining parts made of ductile cast iron as well as for joining parts made of ductile cast iron to parts made of steel. When a part made of ductile cast iron is joined to a part made of steel, unalloyed steel and low-alloy steel in particular are used for the parts made of steel. However, steel parts made of steel having a higher strength, e.g., such as that used in automotive engineering or in crane construction, or parts made of stainless steel may also be used.

Welding rates of more than 4 kg/h, in most cases more than 8 kg/h and in advantageous cases even more than 12 kg/h are advantageously achieved. In advantageous exceptional cases, welding rates of more than 15 kg/h are even achieved. The welding rates intended with the inventive method are preferably in the range of 8 kg/h to 15 kg/h. When using a filling wire as the wire electrode, welding rates of more than 12 kg/h are usually achieved, frequently even more than 15 kg/h. A high productivity is ensured with these welding rates.

In a possible advantageous embodiment of this invention, two welding wires are used to produce the joint. By using two welding wires, welding rates amounting to approximately double the values given above are achieved. The two welding wires need not have the same wire diameters. The welding rates in welding with two wires are thus advantageously more than 8 kg/h, especially advantageously more than 20 kg/h. Using two welding wires is an especially advantageous variant of the inventive method. However the advantageous embodiments pertain not only to the special welding method with two wires but also to the welding method which uses only one welding wire and is the most widely used method.

In an embodiment of this invention, carbon dioxide is added to the protective gas in an amount of 1 vol % to 15 vol %, preferably 2 vol % to 10 vol %. The advantages of the inventive method are especially pronounced with these carbon dioxide amounts. Even when used in amounts by volume at the lower limits, carbon dioxide is sufficiently active to influence the welding process, while on the other hand, even when carbon is used in volume amounts at the upper limits, the possibility of a negative influence on materials and the weld is ruled out.

Oxygen is advantageously provided in an amount of 1 vol % to 3 vol % in the protective gas. When using oxygen, essentially the same advantages are manifested as when using carbon. The upper limits for the addition of oxygen, however, are below the volume amounts of carbon because both ductile cast iron and steel are attacked by the highly active oxygen when present in volume amounts higher than those indicated, and this in turn leads to cracks and pores in and on the welds.

The advantages of this invention are manifested in particular when nitrogen monoxide is additionally added to the protective gas. The arc is effectively stabilized to an extreme by the addition of nitrogen monoxide, resulting in almost pore-free seams. Furthermore, addition of nitrogen monoxide leads to a definite reduction in the ozone emission formed in arc welding and thus improves the conditions at the job site. In addition, the development of splashes is largely suppressed by the addition of nitrogen monoxide. This facilitates handling of the welding burner in manual welding and facilitates the choice of parameters in automatic welding. The advantage of a stable arc is that there is a uniform transfer of material from the consumable wire electrode into the welding bath. Therefore the development of pores is largely suppressed. This stabilizing effect is manifested with all protective gas mixtures of the inventive method. It is especially advantageous with protective gas mixtures containing helium. Since the addition of helium leads to instabilities in the arc, stabilization must be ensured when helium is added and the arc must be stabilized. This is accomplished according to this invention through the carbon dioxide content and also through the oxygen content. In addition, this is achieved in particular by adding nitrogen monoxide. With this extremely active gas, the advantages are manifested with even a microaddition. With addition of nitrogen monoxide in the percentage range, negative effects are already apparent due to the aggressiveness of nitrogen monoxide. Therefore, the nitrogen monoxide content must remain limited to volume amounts of less than 1%. Nitrogen monoxide is therefore advantageously added as a microadditive, preferably being added in the amount of 10 to 5000 vpm (0.001 to 0.5 vol %) nitrogen monoxide (NO) to the protective gas, preferably 100 to 1000 vpm (0.01 to 0.1 vol %) nitrogen monoxide (NO) added to the protective gas. The advantages of the addition of nitrogen monoxide are achieved with these amounts by volume. However, the disadvantages do not occur.

It is particularly advantageous to add helium to the protective gas in amounts of 10 vol % to 60 vol % helium, preferably 20 vol % to 50 vol % helium, especially preferably 30 vol % to 40 vol % helium. The helium preferably replaced volume amounts of argon in the protective gas. However, the use of helium instead of argon, which is much less expensive, increases the cost of the welding operation. The properties of the welding bath are improved as a result of addition of helium and even at high welding speeds the development of pores is suppressed. To achieve a definitely noticeable effect, a helium content of at least 10 vol %, preferably at least 20 vol % should be used.

In an advantageous embodiment of this invention, a corona arc is used. To achieve the desired high melting rates, the use of a corona arc is necessary. Using a corona arc normally leads to a high porosity of the weld. However, the corona arc also yields almost pore-free welds by the inventive method. The development of cracks and defects in the ductile cast iron is also suppressed. Furthermore, the arc and the corona arc are stable and can be controlled well with the inventive method.

In addition, in an advantageous embodiment of this invention, a free electrode length of at least 15 mm, preferably at least 18 mm is used. When using a filling wire, the free electrode length is advantageously increased even further, and a free electrode length of more than 20 mm, in particular more than 23 mm is to be used with advantage. Thus a much larger free electrode length is selected when welding ductile cast iron and ductile cast iron with steel than when welding steel parts. The increased electrode length in comparison with traditional methods supports the arc stability and control of the arc. Furthermore, such a larger free electrode length improves control of the heat input into the welding wire. Therefore, the heat input into the material of ductile cast iron can be controlled better and changes in structure can be suppressed. A free electrode length in the range of 20 to 30 mm is especially recommended. When choosing a wire feed rate in the upper range of the range from approximately 20 m/min to 30 m/min as mentioned for welding ductile cast iron, the free electrode length may even be 37 mm to 42 mm.

In an advantageous embodiment of this invention, the method of pulsed arc welding is used. The advantages of the inventive method are manifested not only when using a corona arc but also with pulsed arc welding.

With a consumable electrode, the electrode is in general the welding wire and no other filling materials are used for the weld. The wire feed rate influences the melting rate and the welding speed and thus also the amount of material in the filling layers. When welding ductile cast iron joints and ductile cast iron-steel joints, the wire feed rate to be used is advantageously in the range of 10 to 50 m/min, preferably 15 to 30 m/min. Such wire feed rates make it possible to produce joints economically. In addition, with the wire feed rate it is also necessary to ensure that there is control of the heat supply and welds are formed without bonding errors. Changes in structure in the ductile cast iron must also be suppressed.

Preferably solid wire or filling wires are used as the wire electrode. The wire diameter is preferably 0.8 to 2.0 mm, especially 1.0 to 1.6 mm. In principle all welding wires that have previously been used for (repair) welding of ductile cast iron are suitable for the inventive method. The main components of such welding wires are in general iron and nickel, with nickel being present in an amount of more than 30 wt %. The amount of carbon is usually 1 wt %. The welding wire frequently also contains more than 10 wt % manganese.

In an advantageous embodiment of this invention, an arc voltage of more than 28 V, preferably in the range of 32 to 45 V is used.

In addition, an electric current of 220 A to 500 A, preferably 260 A to 450 A is advantageously adjusted.

In an advantageous embodiment, the joint is created from at least two weld layers. The following advantageous procedure is suggested: the first layer of the weld, the so-called root layer, is created by the inventive method. Then a second layer, the so-called filling layer, is applied to this first layer. This is normally done in welding to join thick parts. When welding ductile cast iron, surprisingly a previously unknown advantage has been manifested here: as with any welding, there is a heat input into the welding bath and the material surrounding the welding location via the arc in the case of the second layer. This heat input constitutes a heat treatment for the deeper layer. By applying more than one weld layer, consequently there is essentially a heat treatment of the previous weld layer due to the application of the following weld layer. All weld layers except for the weld layer applied last, thus profit from the advantageous effects of the heat treatment on the weld. It should also be pointed out here that when there are multiple weld layers, individual weld layers, in particular the root layer, can also be applied by TIG welding with a non-consumable electrode.

Advantageously at least the parts made of ductile cast iron are preheated to temperature of 200 to 250° C. before the welding operation. This greatly reduces the temperature difference in the ductile cast iron in the vicinity of the welding location and thus contributes toward suppressing structural changes.

In an embodiment of the invention, a delayed cooling of the joined parts are alternatively an after-treatment after the welding process is advantageous. A delayed cooling, preferably achieved by embedding the welded parts in diatomaceous earth, is advantageous in comparison with cooling in air, because this improves the properties of the welding joint.

As an alternative, the parts that are joined are subjected to an after-treatment to improve the mechanical properties, to reduce stresses and to improve the microstructure of the ductile cast iron. To do so, the parts are heated in an oven at 500 to 900° C. for one to three hours after the welding operation and then are cooled in air. With a downstream heat treatment the welding results are improved in comparison with the procedure with delayed cooling. However, acceptable welding results are also achieved even with cooling in ambient air.

An inventive protective gas contains 1 to 25 vol % carbon dioxide and/or 0.5 to 10 vol % oxygen and the remaining volume amount consists of argon or an argon-helium mixture, preferably 2%-10% carbon dioxide, 1%-3% oxygen, nitrogen monoxide, and 30%-40% helium. The advantages of the inventive protective gas mixture consequently correspond to the advantages of the inventive method.

When using the inventive protective gas mixture for joining parts made of ductile cast iron and ductile cast iron and parts of made of ductile cast iron and steel, the advantages of the inventive method are especially pronounced.

BACKGROUND AND DESCRIPTION OF THE DRAWING

FIG. 1 is a graph illustrating a hardness profile over a width of a joint welded in accordance with an embodiment of the present invention.

This invention will now be explained in greater detail below on the basis of six exemplary embodiments in particularly advantageous embodiments and on the basis of FIG. 1.

DETAILED DESCRIPTION

In a first exemplary embodiment, two parts made of ductile cast iron are welded together. The joint is in the form of a V-weld. Before the actual welding process, the two parts are heated to 200° C. In the subsequent MAG welding, corona arc welding is used as the arc mode. The arc voltage is 44 V and the current is 300 A. The wire feed rate here is set at 18 m/min. A solid wire is used, its main components being iron and nickel with a carbon content of less than 1 wt %. The wire diameter is 1.2 mm. For welding, a free electrode length of 25 mm, which is large in comparison with the usual values, is established. According to this invention, a gas mixture of 8 vol % carbon dioxide with the remainder of the volume comprises of argon is used as the protective gas. In addition, the protective gas may contain 275 vpm (0.0275 vol %) nitrogen monoxide. No after-treatment is necessary, but it is advisable to embed the joined parts in diatomaceous earth for cooling immediately after welding until they reach approximately ambient temperature. This yields a tensile strength of 250 MPa and an elongation of 2%.

In the second exemplary embodiment, two parts made of ductile cast iron are joined with a throat seam. The preheating temperature is 250° C. The following settings are selected with MAG welding: corona arc, 45 V arc voltage and 450 A current, 16 m/min wire feed rate, 1.6 mm wire diameter, 28 mm free electrode length. The inventive protective gas contains 10 vol % carbon dioxide, 3 vol % oxygen and argon. In addition to this protective gas mixture, the advantages of this invention are also achieved with a mixture of 10 vol % carbon dioxide, 3 vol % oxygen, 30 vol % helium with the remainder being argon. A protective gas mixture of 15 vol % carbon dioxide in argon and a mixture of 5 vol % oxygen in argon is also possible.

Joining parts made of ductile cast iron and steel is explained in the third exemplary embodiment. The two parts or at least the part made of ductile cast iron is heated to 230° C. before the welding operation. The following parameters are selected for MAG welding: corona arc, 37 V arc voltage and 280 A current, 22 m/min wire feed rate, 1.0 mm wire diameter, 22 mm free electrode length. The throat seam may be designed to be in horizontal position or in PB position. The following protective gas mixture is used: 8 vol % carbon dioxide, 20 vol % helium and the remainder argon. Instead of the carbon dioxide, an amount of 4 vol % oxygen is also possible. An after-treatment recommended to improve the microstructure involves heating the welded parts for two hours at 700° C. and then cooling in air.

In the fourth exemplary embodiment, again a part made of ductile cast iron is to be joined with a part made of steel. In the following protective gas mixtures, the inventive advantages are manifested in a particularly pronounced manner: in the case of a mixture of 5 vol % carbon dioxide, 1000 vpm nitrogen monoxide, 40 vol % helium and the remainder argon as well as with a mixture of 3 vol % oxygen, 200 vpm nitrogen monoxide, 20 vol % helium and the remainder argon. The other welding parameters correspond to those of the exemplary embodiments mentioned above. The free electrode length is selected in deviation from that, amounting to between 28 mm and 32 mm here.

In the fifth exemplary embodiment, a plate of ductile cast iron is joined to a plate of low alloy steel with a V-weld. The plates have a thickness of 15 mm. They are preheated to 250° C. Two weld layers are created. A nickel-based solid wire with a wire diameter of 1.2 mm is used. The welding speed is 28 cm/min. A mixture of 2 vol % carbon dioxide, 30 vol % helium, 275 vpm nitrogen monoxide and the remainder argon is used as the protective gas. The welding parameters for the first layer are: arc voltage 33.3 V, arc current 268 A, wire feed rate 16.1 m/min, free electrode length 37 mm. With these welding parameters, a melting rate of 8.3 kg/h is achieved. For the second layer, the following parameters are used: arc voltage 41.5 V, arc current 308 A, wire feed rate 18 m/min, free electrode length 22 mm. The melting rate here is 9.2 kg/h. The result is a V seam of excellent quality with a tensile strength of 300 MPa and with an elongation of 2%. If instead of the aforementioned protective gas mixture, a gas mixture of 2 vol % carbon dioxide, 275 vpm nitrogen monoxide and the remainder argon is used, this also yields a high quality weld although the tensile strength is lower than that obtained with the helium-based protective gas mixture. FIG. 1 shows the result of the hardness test of the weld produced with the protective gas mixture mentioned first. The abscissa shows the hardness of the steel plate, plotted on the ordinate, at different locations from left toward the right (in mm) across a weld and into the area of the ductile cast iron plate. The area of the weld is indicated by the two vertical bars. It can be seen here that the hardness plotted on the ordinate changes in the area of the weld but the change is very minor. Consequently this is a high quality weld.

In the sixth exemplary embodiment, two plates 15 mm thick made of ductile cast iron are joined together. The plates are preheated to 250° C. The welding parameters include: arc voltage 38 V, arc current 453 A, wire feed rate 27 m/min, wire diameter 1.2 mm, free electrode length 30 mm. The welding speed is 28.5 cm/min and the melting rate is 14 kg/h.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Method for arc welding with a consumable electrode under a protective gas, comprising the steps of:
providing a first part made of ductile cast iron and a second part made of ductile cast iron or steel to be joined;
providing a protective gas that contains at least one of carbon dioxide in a range of 1 to 25 vol % and oxygen in a range of 0.5 to 10 vol %, and the remaining volume of protective gas comprises one of argon and an argon-helium mixture; and
arc welding the first and second parts together with the consumable electrode under the protective gas.

2. Method as claimed in claim 1, wherein two welding wires are used in the arc welding step to produce the joint.

3. Method as claimed in claim 1, wherein carbon dioxide is added to the protective gas in an amount of 1 to 15 vol %.

4. Method as claimed in claim 1, wherein carbon dioxide is added to the protective gas in an amount of 2 to 10 vol %.

5. Method as claimed in claim 1, wherein oxygen is present in the protective gas in an amount of 1 to 3 vol %.

6. Method as claimed in claim 1, wherein nitrogen monoxide is additionally added to the protective gas.

7. Method as claimed in claim 1, wherein helium is present in the protective gas at 10 to 60 vol %.

8. Method as claimed in claim 1, wherein helium is present in the protective gas at 20 to 50 vol %.

9. Method as claimed in claim 1, wherein helium is present in the protective gas at 30 to 40 vol %.

10. Method as claimed in claim 1, wherein a corona arc is used in the arc welding step.

11. Method as claimed in claim 1, wherein a free electrode length of at least 15 mm is used.

12. Method as claimed in claim 1, wherein pulsed arc welding is used in the arc welding step.

13. Method as claimed in claim 1, wherein a wire feed rate of 10 to 50 m/min is used in the arc welding step.

14. Method as claimed in claim 1, wherein a wire feed rate of 15 to 30 m/min is used in the arc welding step.

15. Method as claimed in claim 1, wherein a wire diameter of 0.8 to 2.0 mm is used in the arc welding step.

16. Method as claimed in claim 1, wherein a wire diameter of 1.0 to 1.6 mm is used in the arc welding step.

17. Method as claimed in claim 1, wherein an arc voltage of more than 28 V is used in the arc welding step.

18. Method as claimed in claim 1, wherein an arc voltage in a range of 32 V to 45 V is used in the arc welding step.

19. Method as claimed in claim 1, wherein a current of 220 A to 500 A is used in the arc welding step.

20. Method as claimed in claim 1, wherein a current of 260 A to 450 A is used in the arc welding step.

21. Method as claimed in claim 1, wherein the first and second parts are joined by a weld joint created from at least two weld layers in the arc welding step.

22. Method as claimed in claim 1, wherein at least the ductile cast iron parts are preheated to temperatures of 200° C. to 250° C. before the arc welding step.

23. Method as claimed in claim 1, wherein the joined parts are heated to temperatures between 500 and 900° C. for 1 to 3 hours after the arc welding step.

24. Method for arc welding with a consumable electrode under a protective gas, comprising the steps of:
providing a first part made of ductile cast iron and a second part made of ductile cast iron or steel to be joined;
providing a protective gas that contains at least one of carbon dioxide in a range of 1 to 25 vol % and oxygen in a range of 0.5 to 10 vol %, and the remaining volume of protective gas comprises one of argon and an argon-helium mixture; and
arc welding the first and second parts together with the consumable electrode under the protective gas,
wherein the joined parts are cooled in diatomaceous earth after the arc welding step.

* * * * *